(12) United States Patent
Wilson

(10) Patent No.: US 11,140,286 B2
(45) Date of Patent: Oct. 5, 2021

(54) SYSTEM AND METHOD FOR ALIGNMENT OF SCAN DOCUMENTS

(71) Applicant: Toshiba TEC Kabushiki Kaisha, Shinagawa-ku (JP)

(72) Inventor: Silvy Wilson, Rancho Santa Margarita, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/786,025

(22) Filed: Feb. 10, 2020

(65) Prior Publication Data
US 2020/0177736 A1    Jun. 4, 2020

Related U.S. Application Data

(63) Continuation of application No. 16/172,449, filed on Oct. 26, 2018, now abandoned.

(51) Int. Cl.
*H04N 1/00* (2006.01)
*H04N 1/047* (2006.01)

(52) U.S. Cl.
CPC ....... *H04N 1/0044* (2013.01); *H04N 1/00251* (2013.01); *H04N 1/00411* (2013.01); *H04N 1/047* (2013.01); *H04N 2201/0094* (2013.01)

(58) Field of Classification Search
CPC ............ H04N 1/0044; H04N 1/00251; H04N 1/00411; H04N 1/047; H04N 2201/0094
USPC .......................................... 358/1.9, 1.15, 505
See application file for complete search history.

(56) References Cited

U.S. PATENT DOCUMENTS

| | | | |
|---|---|---|---|
| 8,699,091 B2 | 4/2014 | Rumford et al. | |
| 2005/0185225 A1* | 8/2005 | Brawn | H04N 1/00403 358/401 |
| 2018/0007233 A1* | 1/2018 | Aramaki | H04N 1/00442 |

OTHER PUBLICATIONS

Thollot, Julien; Extended European Search Report for European Patent No. EP 19191199 and Search Opinion; dated Apr. 3, 2020; 9 pages.

* cited by examiner

*Primary Examiner* — Quang N Vo
(74) *Attorney, Agent, or Firm* — Ulmer & Berne LLP

(57) ABSTRACT

A system and method for aligning documents for scanning includes a multifunction peripheral with a controller having a processor and associated memory. The controller issues instructions controlling operation of a scanner. A tangible document is placed on a surface of a scanner platen, and a sensor determines its location relative to the platen. An optimal position of the document relative to the platen is determined. The processor then generates a graphical rendering on an associated display indicative of a directed repositioning of the document on the platen in accordance with a determined optimal position of the document relative to the platen.

20 Claims, 5 Drawing Sheets

SYSTEM AND METHOD FOR ALIGNMENT OF SCAN DOCUMENTS

CROSS-REFERENCE TO RELATED APPLICATIONS

This application is a Continuation application Ser. No. 16/172,449 filed on Oct. 26, 2018, which is incorporated herein by reference.

TECHNICAL FIELD

This application relates generally to simultaneous photocopying or scanning of documents. This application relates more particularly to aligning documents on a scan platen for placement on printout paper.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Tangible documents can be scanned one at a time by lifting a scanner cover, placing a document on a platen, closing the cover and issuing a "scan," "fax" or "copy" instruction. In these instances, each scan or copy operation will typically result in one printed page or one electronic file per operation. When a document is fed to a scanner via an automatic document feeder (ADF), text or images on the scan document will align with the scanner, and accordingly, will align with page edges of a printout. In many instances, a single scan document will be placed directly on a scan platen by a user. The user lifts a cover, which may include an ADF, places the document, content down, on the scan platen, closes the cover and pushes a scan or copy button. In a copy operation, the user may look at the ensuing copy and notice that the scan document was crooked or positioned improperly, resulting with a skewed scan image, an image mis-positioned on the printout, or an image that was cutoff. The user must then re-raise the cover, reposition the scan document, and try again. It may take several scan iterations before the user is satisfied with the result. This wastes tone, ink, paper and electricity, as well as wasting time and causing user frustration.

BRIEF DESCRIPTION OF THE DRAWINGS

Various embodiments will become better understood with regard to the following description, appended claims and accompanying drawings wherein:

DETAILED DESCRIPTION

Figure 1:
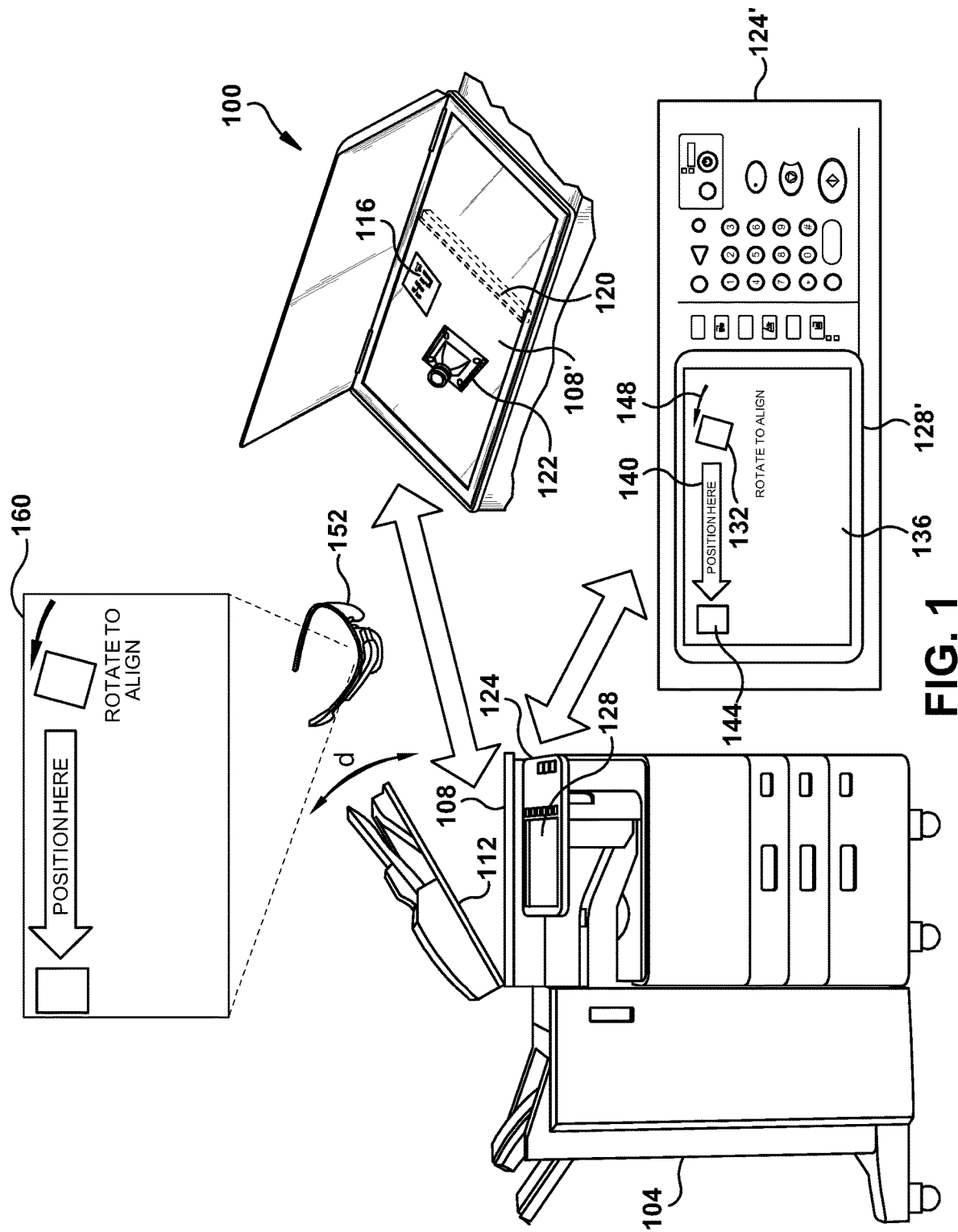
FIG. 1 is an example embodiment of a document scanning system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment a multifunction peripheral includes a controller having a processor and associated memory. The controller issues instructions controlling operation of a scanner. A tangible document is placed on a surface of a scanner platen, and a sensor determines its location relative to the platen. An optimal position of the document relative to the platen is determined. The processor then generates a graphical rendering on an associated display indicative of a directed repositioning of the document on the platen in accordance with a determined optimal position of the document relative to the platen.

When scanning a document, an automatic document feeder (ADF) is not always used. In some situations, a scan document may be too large or too small, or of non-uniform shape, rendering an ADF unusable. In such in instances, a single scan document will be placed directly on a scan platen by a user. The user lifts a cover, which may include an ADF, places the document, content down, on the scan platen, closes the cover and pushes a scan or copy button. In a copy operation, the user may look at the ensuing copy and notice that the scan document was crooked or positioned improperly, resulting with a skewed scan image, an image mis-positioned on the printout, or an image that was cutoff. The user must then re-raise the cover, reposition the scan document, and try again. It may take several scan iterations before the user is satisfied with the result. This wastes tone, ink, paper and electricity, as well as wasting time and causing user frustration.

An electronic scan image may be faxed or converted into a facsimile transmission. Electronic images can also be sent to a network destination, such as by attaching them to an e-mail for electronic delivery. Documents, particularly smaller documents such as receipts or pictures, are often flimsy, and may shift on a platen or even fall off entirely when a cover is lowered for copying. A scan image of a document inclusive of characters, such as text, may be placed through an optical recognition (OCR) algorithm to extract character data, such as cost reflected by the receipt. OCR programs may be adversely affected by character information on a scan image that is oriented incorrectly.

Documents come in an expansive number of sizes and shapes. It can be extremely problematic to align them on a platen. And, if this is attempted, a user must further position a document as best possible so that all character information is horizontally or vertically aligned with the scanner. This is particularly important if an OCR operation is to be performed on an image embodying multiple documents.

In an example embodiment, a MFP scanner platen may have a size of approximately 12×18 inches.

In accordance with the forgoing application, FIG. 1 illustrates an example embodiment of a document scanning system 100 that includes MFP 104. MFP 104 includes a scanner configured to scan documents disposed on platen 108. Scanner cover 112, illustrated as part of an automated document feeder (ADF), is moveable relative to platen 108 to cover documents placed on the platen 108 during a scan operation. If a scan is made without the cover 112, areas not covered by a document are subject to extreme overexposure and will appear black on the resultant scan. Printouts of such scans require large amounts of extraneous toner. In the example embodiment, cover 112 is pivot-able relative to platen 108 in a direction "d." A perspective view of platen 108 is found at 108'. Platen 108' illustrates placement of document 116 on a surface thereof. Document 116 is suitably placed, image portion down, in a desired orientation for scanning as noted above.

In the example embodiment of FIG. 1, a controller or embedded computer of MFP 104 senses a position of document 116 relative to platen 108. Any suitable position sensor may be used, including fabrication of platen 108 with a touch sensitive surface grid. A pre-scan to determine position may be made by scan bar 120. Position may also be suitably sensed by a digital camera, suitably positioned above or below a platen, such as CCD camera 122.

As noted above, when a scan is made with an open cover 112, it provides a high contrast image between the placed document image and the uncovered platen portion, which would appear black in an ensuing printout. However, when the image is used for position or orientation detection, there is no waste of paper or toner during a positioning calculation. Such a determination of position is suitably made relative to a position of a document on the platen 108. However, a platen position is not necessarily aligned with a position of a scan image as it will appear on paper. In another example embodiment, the MFP controller is provided with data corresponding to a paper size of print stock. Such size may be fixed, such as A4 or 8½ by 11 inches. In other instances, paper size may be selectable, either by selection of a particular paper tray, or by placement of different sized paper in sheet feeder. Paper size detection is accomplished by any suitable means as will be appreciated by one of ordinary skill in the art. In this example embodiment, the MFP controller can determine how the scan document 116 will be positioned relative to sheet stock to be used for a printout.

MFP includes a user interface 124 that includes user input and a display, suitably comprising touchscreen display 128, an expanded view of which appears at 124' and 128'. The MFP controller, using a sensed location and orientation of document 116 relative to platen 108 or print stock, generates a display comprising a graphic 132 corresponding to relative position and orientation of document 116. Boundary 136 suitably corresponds to relative paper size of stock that is targeted for an ensuing scan printout. Also displayed is a directional arrow 140 directing the user to move document 116 to a new position on platen 108, toward the upper left corner in the illustrated example. A rotation indicator 148, with corresponding rotation instructions, is also suitably generated. Directed document movement may suitably be a single instruction, or alternatively, an additional checks and direction for further adjustment. Such readjustment may be in discrete test intervals, such as when positioning is detected via a scan operation, or ongoing instructions are suitably generated real time, such that movement instructions are updated and displayed as the document is being repositioned. This example embodiment is more easily implemented when positioning is monitored continuously, such as with CCD camera 122.

In examples detailed above, a copier user interface was utilized to provide document repositioning information. In alternative embodiments, a user may use a portable digital device including a display and a camera directed to the platen surface for repositioning instructions. Examples of such devices include smart glasses 152 or any other suitable portable data device. In such alternative embodiments, similar document positioning instructions are provided via an integrated display, appearing to the user as visual directions 160. As noted above, such positioning is suitably a single instructions, two or more discrete instructions, or real time direction relative to document movement. Information as to a size or sizes of available paper for printing is suitably obtained by the portable data device for use in directed positioning as will detailed further below. Such information may be preprogrammed in the device or communicated to it from an associated MFP, such as via any suitable wireless data communication system.

Figure 2:
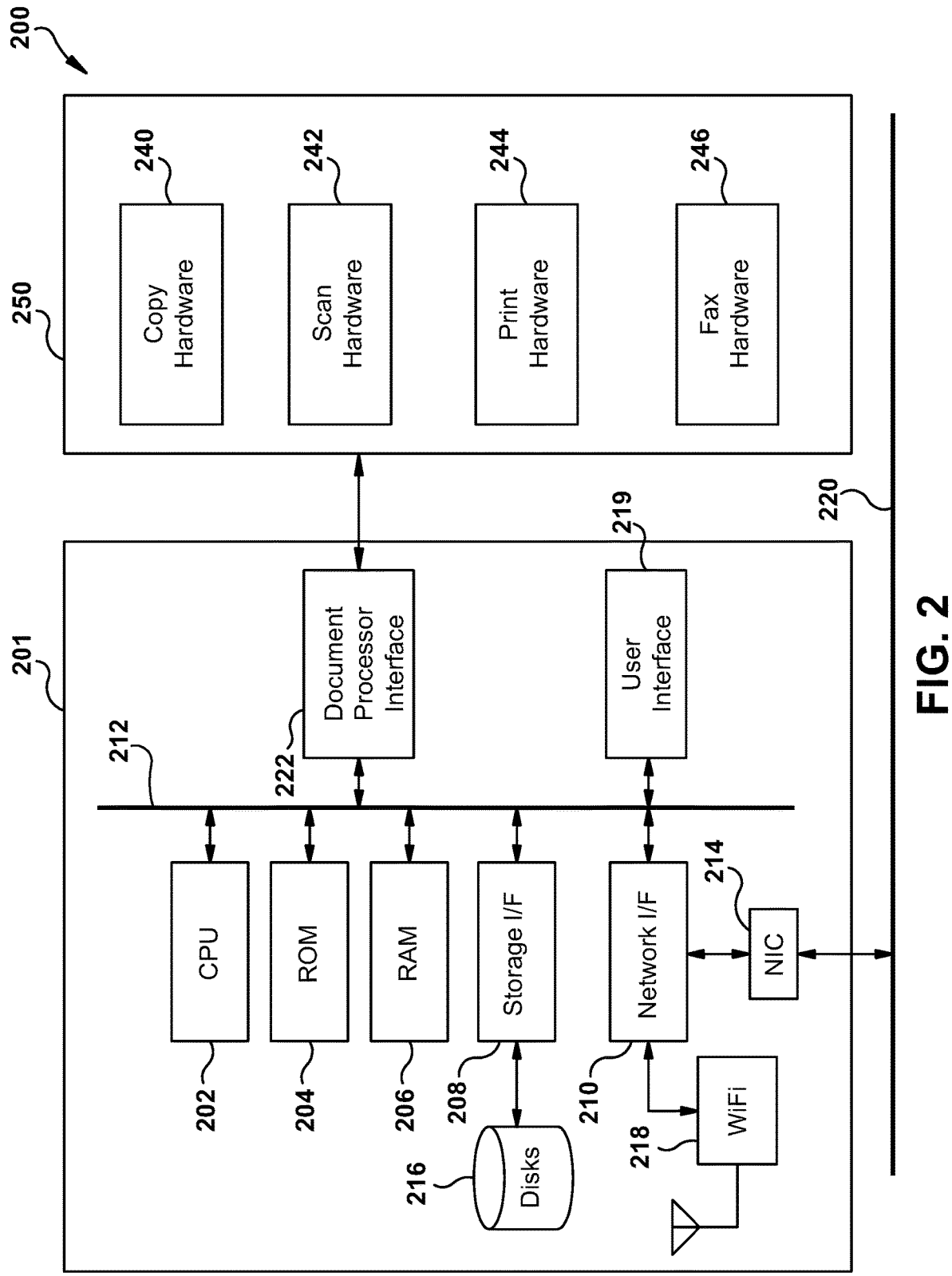
FIG. 2 is an example embodiment of a multifunction peripheral.

Turning now to FIG. 2 illustrated is an example embodiment of a networked digital device comprised of document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250.

Figure 3:
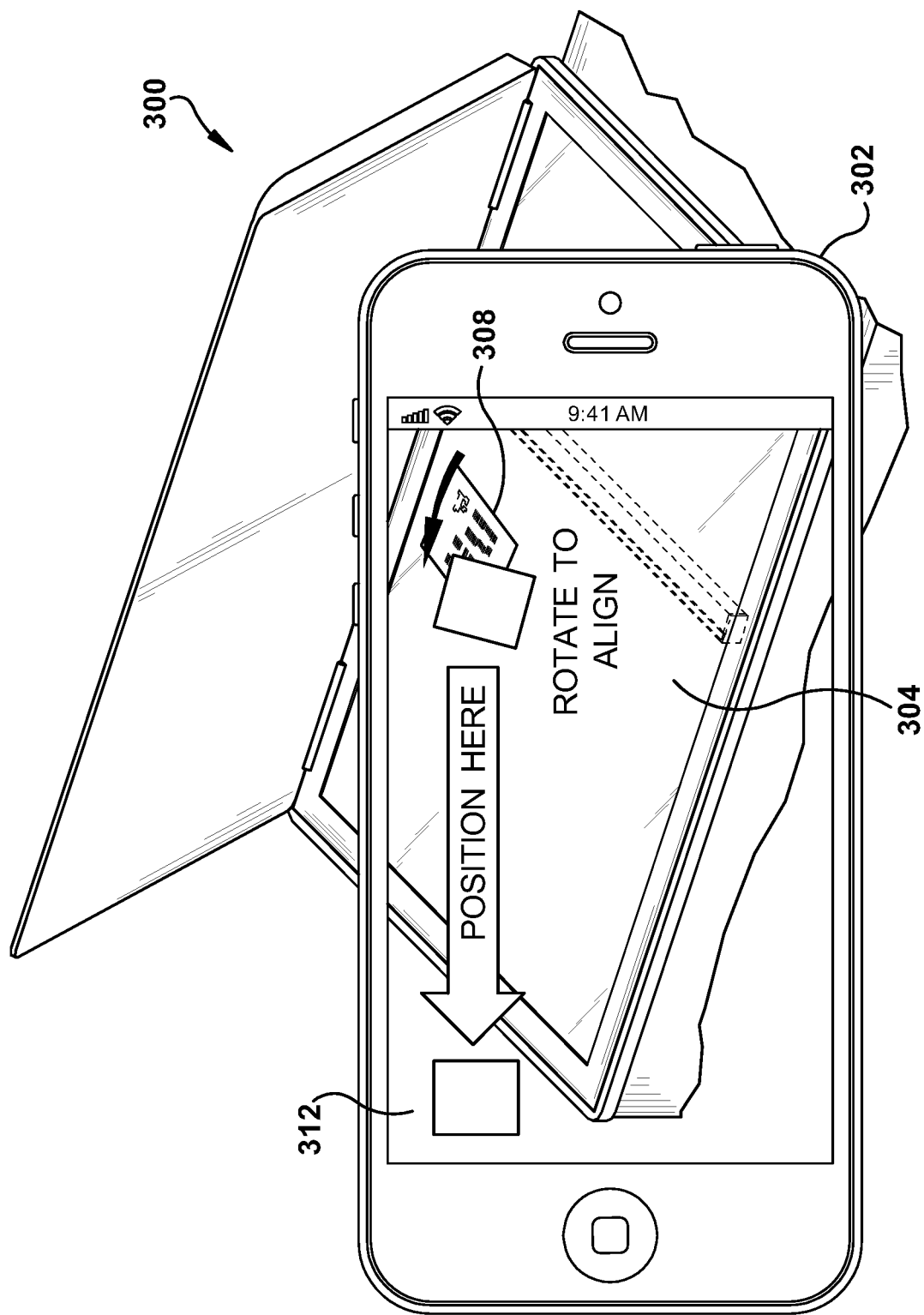
FIG. 3 is an example embodiment of an augmented reality scan document positioning system.

FIG. 3 illustrates an example embodiment of an augmented reality document positioning system 300 using a portable digital device such as smartphone 302, an integrated digital camera of which is directed to an MFP platen 304 on which document 308 is positioned. An integrated display 312 displays document positioning instructions such as described in detail above, suitably relative to the device platen itself which is displayed concurrently with the positioning instructions. As noted above, such positioning is suitably a single instruction, a series of instructions, or real time relative to movement of document 308.

Figure 4:
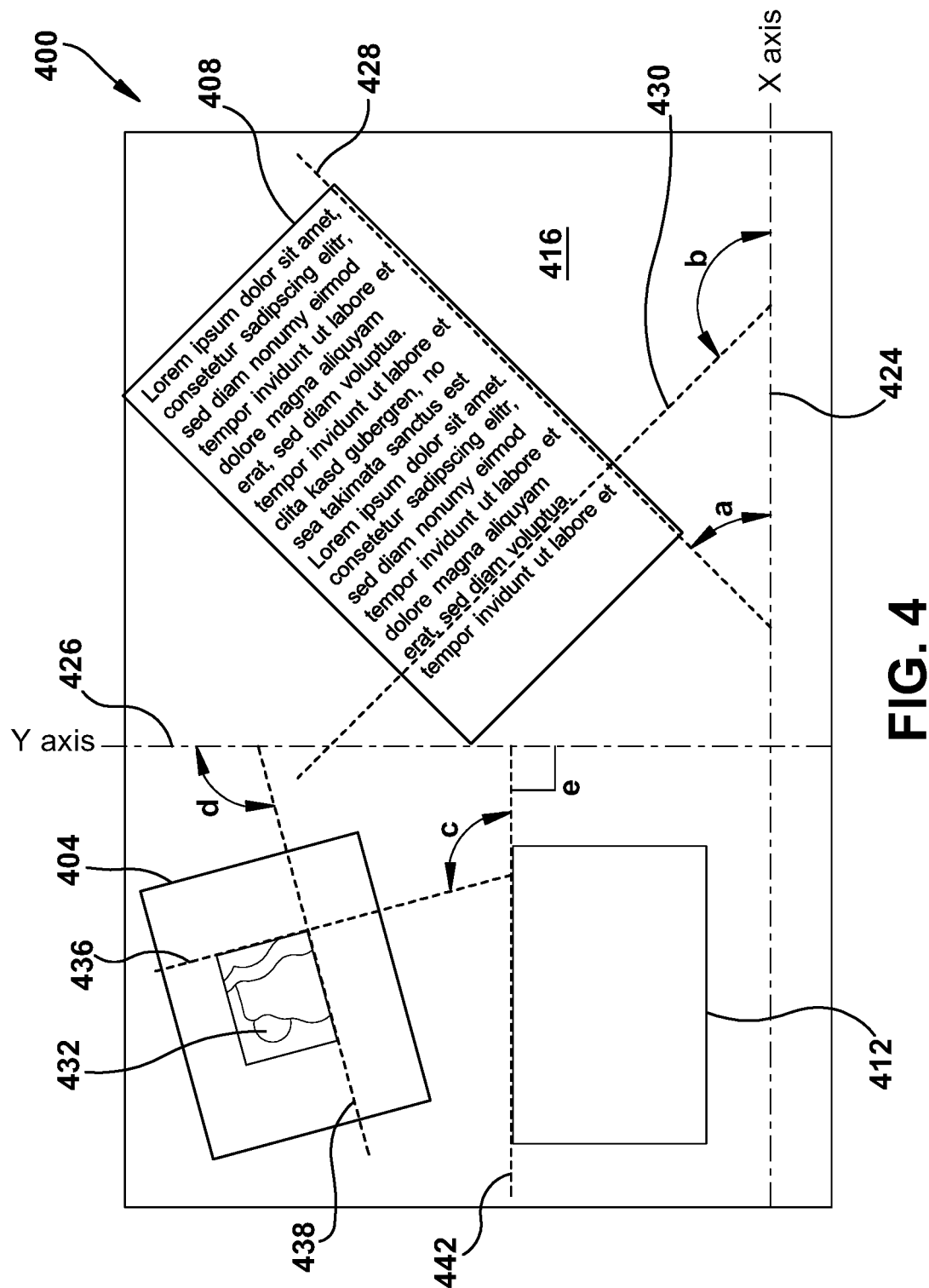
FIG. 4 is an example embodiment of a scan document alignment determination system.

FIG. 4 illustrates example embodiments of a document alignment determination system 400. A document, such as document 404, document 408 or document 412 is placed on a surface of platen 416. A scanned document is suitably stored in device memory, suitably aligned with corresponding, parallel edges of a rectangular platen or printout paper such as illustrated by perpendicular x axis 424 and y axis 426. While rectangular coordinates are illustrated as conveniently associated with conventional, rectangular platens, it will be understood that any suitable coordinate system may be used, such as polar coordinates.

In the example embodiment of FIG. 4, one or more linear elements are detected for documents 404, 408 or 412. Document 408 includes text, which can include characters, or glyphs, of any language. Text is generally linearly arranged in rows leaving a detectible linear relationship as evidenced by a line 430 which is defined by a text row. Text margins may also be used to define a linear orientation. In the example, text is right justified, allowing a line 428 to be determined by a right hand side of the text area. Alternatively, or in addition, a left margin may be used to define a line. Most character sets from typewriters, word processors and the like are generally left justified. Additionally, individual characters or glyphs may be used to detect the orientation. An intersection between determined lines 428, 430 and one or more defined axes of the image allows for determination of relative orientation, such as by angles a and b. It will be appreciated that any angular relationship is suitable to calculate orientation, either acute, obtuse or perpendicular. Two or more determined angular relationships between known axis orientations and extracted linear relationships allow for determining an image rotation such that it aligns with known axes. Optical character recognition (OCR) for characters in an image is more readily accomplished on aligned images. Once text has been subject to OCR processing, it can be readily determined if an image is inverted and a 180 degree rotation is suitably made when this is detected.

In the example of document 404, edges of a rectangular picture area 432 are suitably used to generate lines 436 and 438 to facilitate de-skewing required in accordance with angles c and d relative to axes 424 and 428. Document 412 is rectangular and an edge is used to define line 442 which intersects y axis 426 at a right or 90 degree angle e. In this example, no de-skewing may be needed. However, any detectable image portion may be used to verify whether the image is rotated 90 degrees or 180 degrees, and if so, appropriate rotation instruction generation suitably accomplished.

Figure 5:
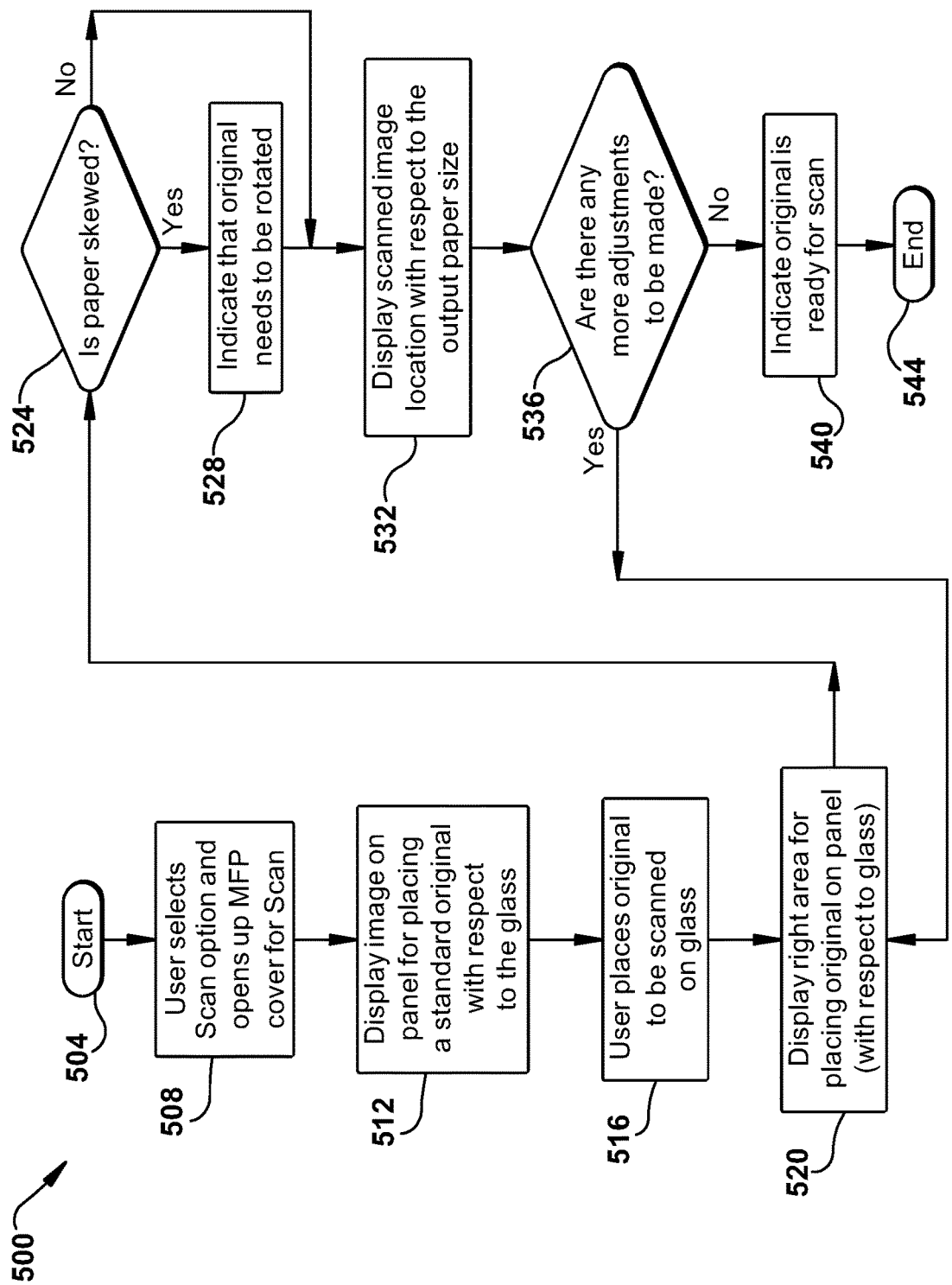
FIG. 5 is a flowchart of an example embodiment of a scan document alignment system.

FIG. 5 illustrates a flowchart 500 of an example embodiment of a scan document alignment system 500. The process commences at block 504 and proceeds to block 508 when an MFP user selects a scan operation, which may be part of a copy operation, and opens the MFP platen cover. A display is generated on an MFP touchscreen at block 512 for placement of a standard original document since this is the most likely document to be scanned. The user places the original document on the MFPs platen glass at block 516. The paper position is sensed a correct display area for placement of the original is generated at block 520. A determination is made at block 524 as to whether the paper is skewed. If so, an indication is generated on the display at block 528 relative to desired rotation of the paper. If paper is not skewed, or once skewing has been adjusted, a display of the scan image relative to associated output paper is generated at block 532. A test is made at block 536 to determine if additional adjustment is advised. If so, the process returns to block 520. If not, an indicator is generated to the user at block 540 that scanning is ready. Scanning is suitably automatically commenced if a document is positioned acceptably, or commenced by user selection of a scan button. The process suitably ends at block 544.

While the forgoing example was illustrated relative to a scan operation for document position sensing, it is to be appreciated that alternatives such as those noted above, including portable digital devices or augmented reality, are also options for operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a controller including a processor and associated memory;
   a scanner operable in accordance with instructions received from the controller;
   an uncovered scan platen configured to receive a tangible document on a surface thereof; and
   a sensor configured to capture a digital image associated with a position and angular orientation of a received tangible document relative to the uncovered scan platen,
   wherein the processor is configured to determine an optimal position and angular orientation of the tangible document relative to the scan platen in accordance with document boundary areas or text orientation determined from a captured digital image and currently selected paper size;
   the processor further configured to generate a graphical rendering on an associated display indicative of a directed repositioning and rotation of the tangible document on the scan platen in accordance with a determined optimal position of the tangible document relative to the scan platen;
   the processor further configured to capture at least a second digital image of the tangible document after repositioning thereof in accordance with the directed repositioning and rotation; and
   the processor further configured to complete a scan operation when a digital image of the tangible is captured with the optimal position and angular rotation while the scan platen is covered.

2. The multifunction peripheral of claim 1 wherein the scanner comprises the sensor.

3. The multifunction peripheral of claim 2 further comprising display comprised of a touchscreen display comprising a user interface of the multifunction peripheral.

4. The multifunction peripheral of claim 1 further wherein the sensor is comprised of a digital camera, and wherein the processor is further configured to determine the angular rotation in accordance with a linear property of the tangible document.

5. The multifunction peripheral of claim 4 wherein the digital camera is integrated into a portable data device directed to the scan platen.

6. The multifunction peripheral of claim 5 wherein the display is integrated into the portable data device.

7. The multifunction peripheral of claim 6 wherein a processor associated with the portable data device generates an image of the scan platen and tangible document with a concurrent augmented reality graphic indicative of the directed repositioning of the document relative to the image of the scan platen.

8. The multifunction peripheral of claim 1 further comprising:
a paper feeder storing paper stock of a known size,
wherein the processor is further configured to generate the graphical rendering in accordance with a depiction of a positioning of an image of the tangible document relative to an image corresponding to the size of the paper stock.

9. A method comprising:
receiving digital image input from a sensor indicative of a position and angular orientation of a tangible document on a uncovered scanner platen;
determining from the digital image and currently selected paper size, via a processor and associated memory, an optimal position and angular orientation of the tangible document relative to the scanner platen;
generating a graphical rendering on an associated display indicative of a directed repositioning and rotation of the tangible document on the scanner platen in accordance with a determined optimal position of the tangible document relative to the scanner platen;
covering the scanner platen and tangible document capturing at least a second digital image of the tangible document in the covered platen after repositioning thereof in accordance with the directed repositioning and rotation; and
completing a scan operation when a digital image of the tangible document is captured with the optimal position and angular rotation.

10. The method of claim 9 further comprising generating, via the sensor, data indicative of a position of the tangible document on the scanner platen.

11. The method of claim 10 further comprising generating the graphical rendering on a touchscreen display comprising a user interface of a multifunction peripheral.

12. The method of claim 9 further comprising capturing a digital image of the tangible document via a sensor comprised of a digital camera, and determining the angular rotation in accordance with a linear property of the tangible document.

13. The method of claim 12 wherein the digital camera is integrated into a portable data device directed to the scanner platen.

14. The method of claim 13 wherein the display is integrated into the portable data device.

15. The method of claim 14 further comprising generating an image of the scanner platen and the tangible document on the display with a concurrent augmented reality graphic indicative of the directed repositioning of the tangible document relative to the image of the scanner platen.

16. The method of claim 9 further comprising:
storing paper size data indicative of a size of paper stock disposed in an associated sheet feeder; and
generating the graphical rendering in accordance with a depiction of a positioning of an image of the document relative to an image in accordance with the paper size data.

17. A system comprising:
a digital camera configured to capture a digital image of a tangible document disposed on a surface of a scanner platen;
a display; and
a processor and associated memory,
the processor configured generate a document image of the tangible document on the display, wherein a position of the document image on the display corresponds to a position and angular orientation of the tangible document on the scanner platen obtained from a scan of the tangible display on an uncovered platen,
the processor further configured to define an adjusted position and angular orientation of the tangible document on the scanner platen in accordance with the captured digital image and currently selected paper size,
the processor further configured to generate a graphical indicator on the display indicative of a movement and rotation of the tangible document relative to the surface of the scanner platen in accordance with a defined, adjusted position,
the processor further configured to capture at least a second digital image of the tangible document with the platen covered after repositioning thereof in accordance with the directed repositioning and rotation, and
the processor further configured to complete a scan operation when a digital image of the tangible document is captured with the optimal position and angular rotation.

18. The system of claim 17 wherein the adjusted position of the tangible document is further defined in accordance with a paper dimension associated with printout paper used by a multifunction peripheral comprising the scanner platen.

19. The system of claim 18 wherein the processor is further configured to generate a border corresponding to the paper dimension on the display concurrently with the graphical indicator.

20. The system of claim 17 wherein the processor is further configured to generate an image of the scanner platen on the display concurrently with the graphical indicator.

* * * * *